Aug. 3, 1954
H. A. MULVANY ET AL
2,685,312
ELECTRIC WALNUT CRACKING MACHINE
Filed June 13, 1949
3 Sheets-Sheet 1
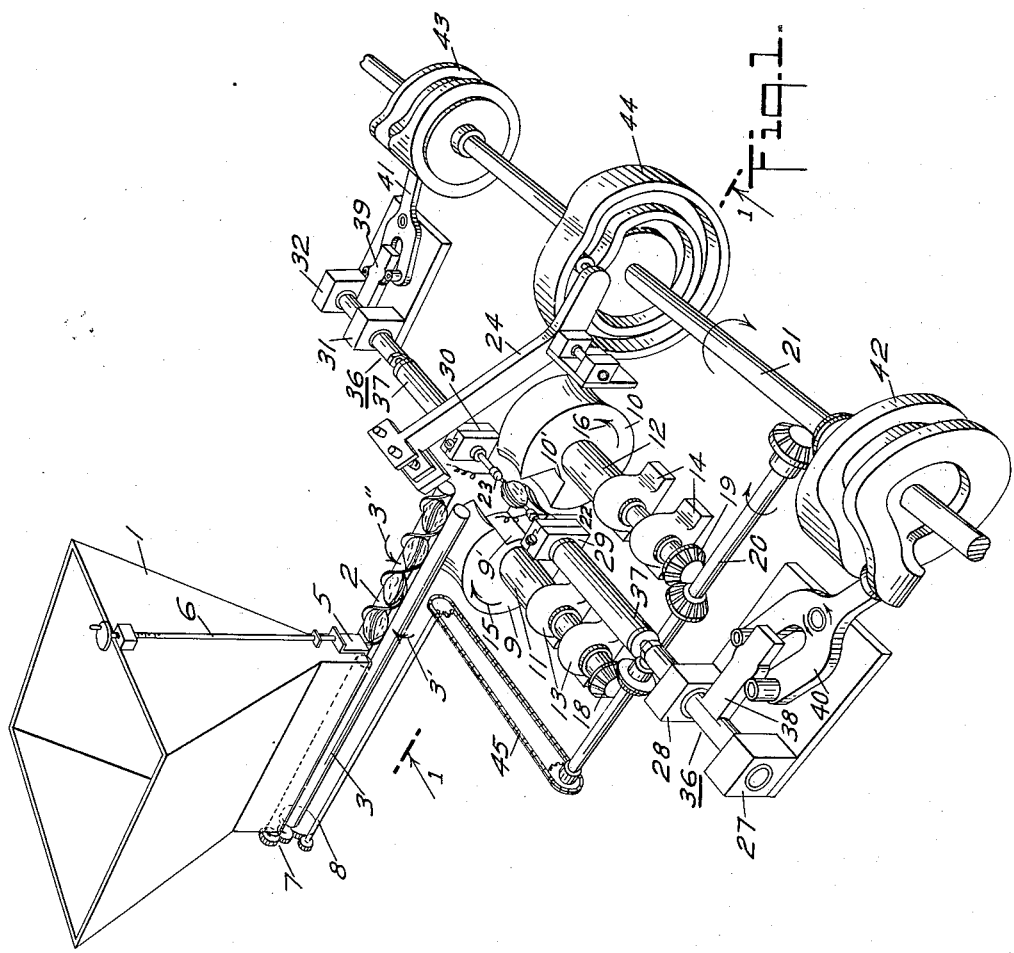
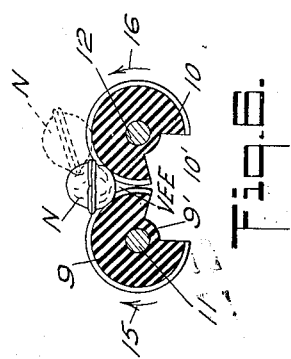
INVENTORS
HARRY A. MULVANY
EDWIN H. SCHOOLCRAFT
MELVIN J. KOFOID
BY
G. F. McDougall
ATTORNEY Aug. 3, 1954
H. A. MULVANY ET AL
2,685,312
ELECTRIC WALNUT CRACKING MACHINE
Filed June 13, 1949
3 Sheets-Sheet 2
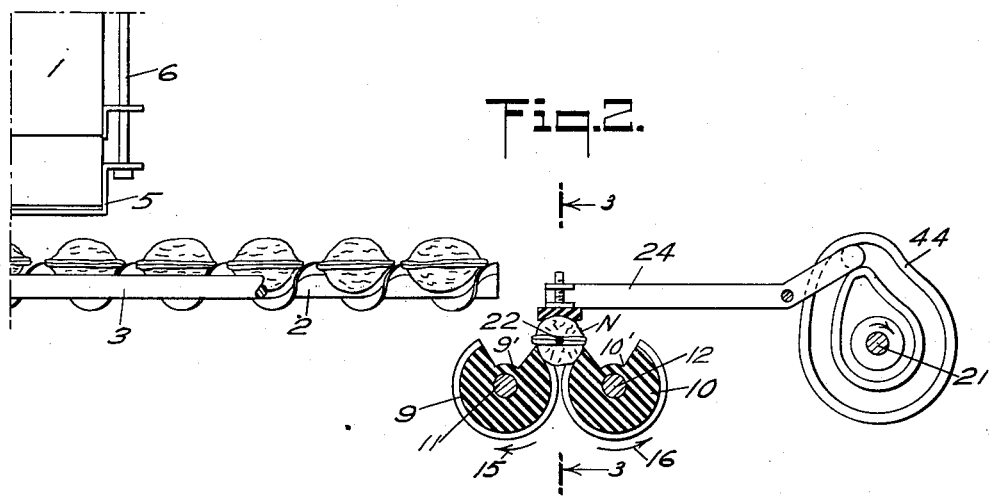
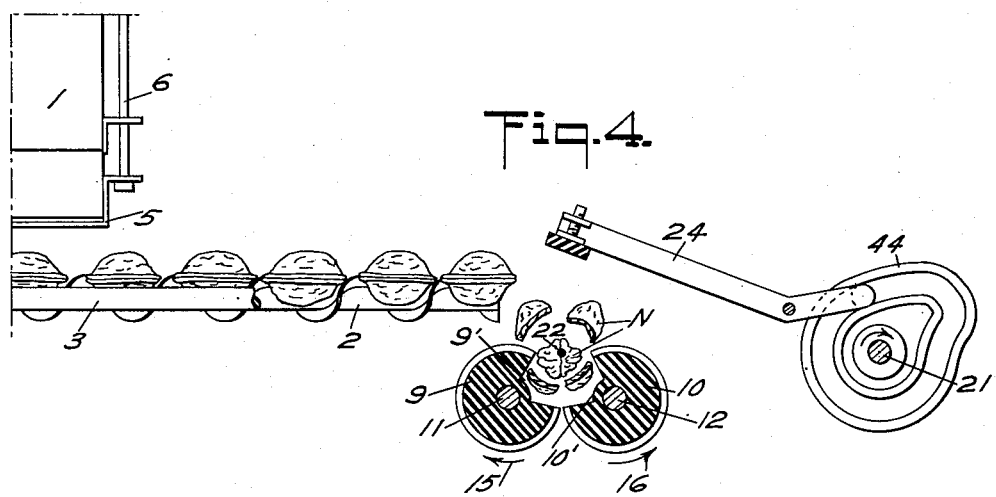
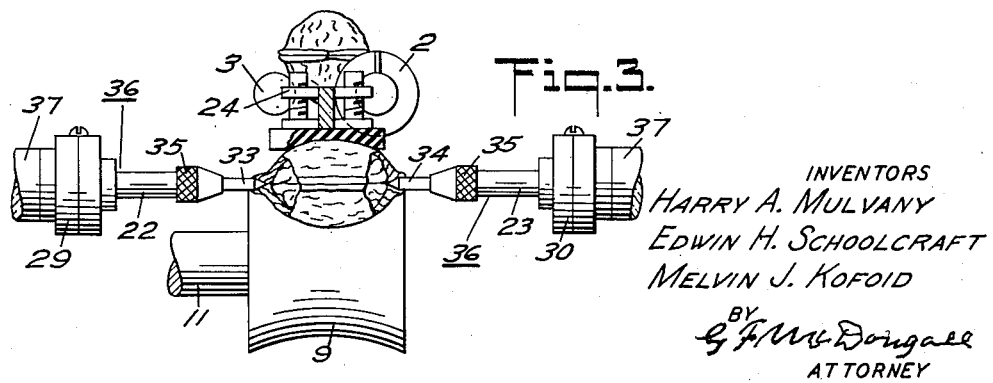
INVENTORS
HARRY A. MULVANY
EDWIN H. SCHOOLCRAFT
MELVIN J. KOFOID
BY G. F. McDougall
ATTORNEY

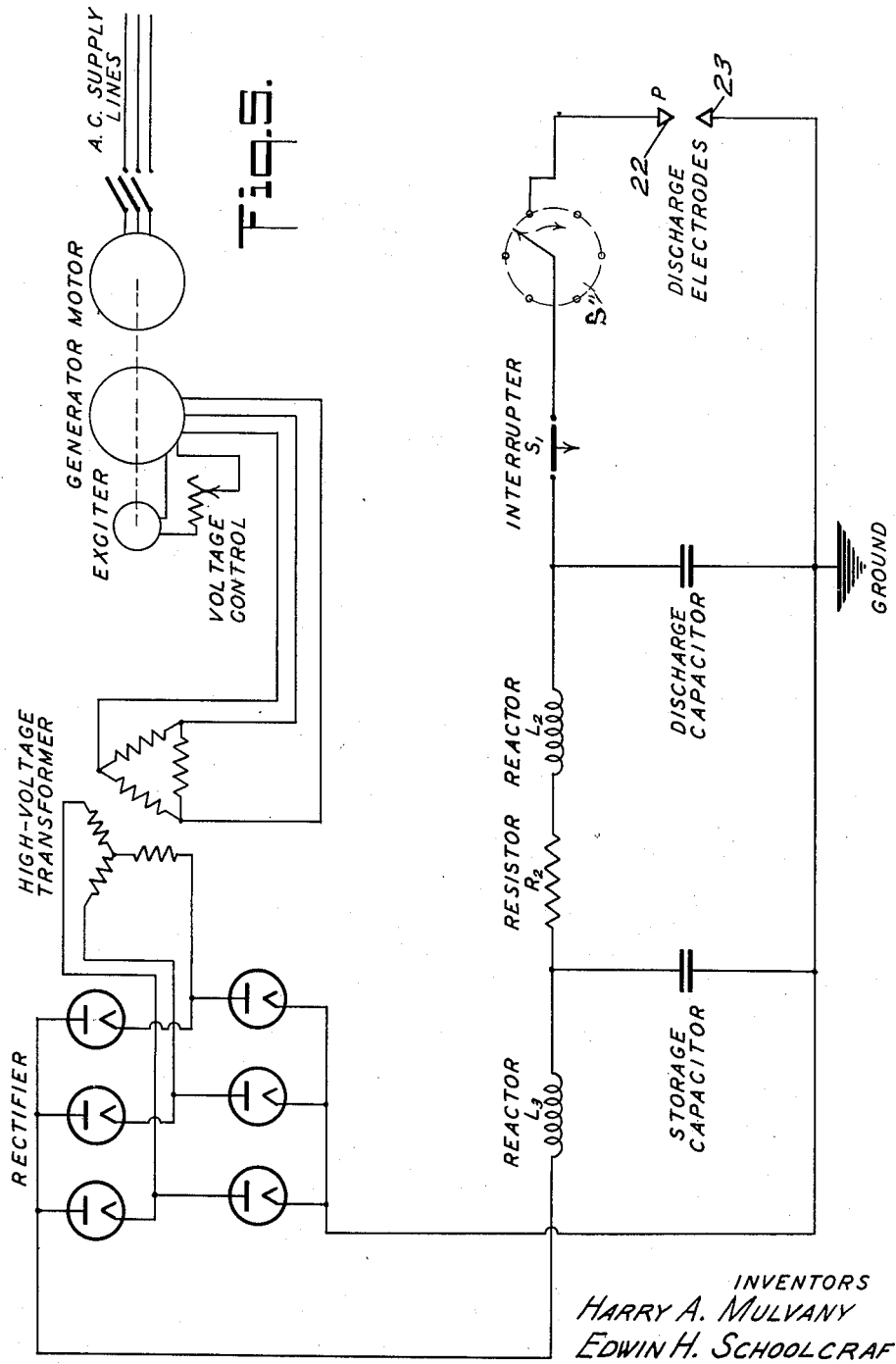

Patented Aug. 3, 1954

2,685,312

UNITED STATES PATENT OFFICE 2,685,312

ELECTRIC WALNUT CRACKING MACHINE

Harry A. Mulvany, Berkeley, Calif., and Melvin J. Kofoid, Corvallis, and Edwin H. Schoolcraft, Forest Grove, Oreg., assignors to Northwest Nut Growers, Dundee, Oreg., a cooperative association of Oregon Application June 13, 1949, Serial No. 98,732

9 Claims. (Cl. 146—8)

This specification relates to a new machine in a new art, electric walnut cracking for cultivated walnuts.

The invention claimed is of a combination of elements, some of which will be independently presented in succeeding co-pending applications.

The overall object is a machine capable of completely superseding the presently practiced percussion practice of cracking cultivated walnuts, which is productive of huge waste because of the partial destruction of the nut kernels, hereinafter called by the commercial name of "meats".

The shells of walnuts can be exploded away from the nut meats by passing a suitable electric surge discharge through the interior of the nuts. The nut meats are removed completely from the shell, which is fragmented. Nut meat halves are separated from each other and in (it is believed) around ninety per cent of the meat product, the halves will be unbroken and perfect. The membrane-like "separator" that exists between the halves, is blown completely free.

A basic electric problem involved is to cause the electric discharge to pass through the shell interior, rather than to flash over the exterior surface. The problem is difficult because it involves simultaneous puncture of two spaced apart shell wall structures, of excellent dielectric qualities, requiring a high electric voltage to produce electric puncture.

However, the walnut has a fortuitous construction for electric cracking, as there is a hole through the shell at the stem end and also a very minute hole exists through the shell at the blossom end. An easy path for establishment of an electric breakdown surge through the shell is made possible without the necessity of manual or mechanically made holes.

Secondly, only a discharge passing through the nut interior in the direction of the holes naturally formed in the opposite ends can explode the nut without the very great possibility of severely breaking up the meat halves; whole halves and not crumbs, hard to recover, are the most valuable product that can be produced.

The chief mechanical object of the combination is to cause two oppositely facing electrodes to be placed in shell shattering relation to the major axis of the nut, as shown schematically in Fig. 3, though actual penetration will usually produce minor fracture of the shell, which does no harm.

When two electrodes are caused to penetrate the shell, or even only one penetrates slightly and the other is very close to a natural hole, the nut nearly always explodes. Which statement is true for opposite electrode penetration at other places, such as sides, so long as the points are on opposite sides of the shell at a point located at about the maximum flash-over surface distance apart; but the results of such placement are unsatisfactory for damage to meats as noted.

Walnuts can be cracked satisfactorily if the electrodes are merely in contact at opposite ends of the major axis of the nut, provided the alignment with the natural holes is sufficiently accurate and closely spaced. Walnuts can also be cracked without either electrode being in actual contact, if sufficiently accurate alignment of the major axis of the nut and the axes of the electrodes is maintained and the air gaps very small; hence it is not intended to limit ourselves to ideal conditions, which as at present understood is actual puncture of the shell, assisted perhaps by the presence of natural holes.

It is a further object to supply mechanisms combined in a cooperative electromechanical machine that will produce the necessary precision alignment and positioning of walnuts for cracking for penetration electrode cracking at sufficiently high speed, say one hundred fifty walnuts per minute, which should be good commercial production speed, as at present advised.

Drawings showing the present preferred embodiment of operative parts, some as stated being believed to be novel and others merely modifications of known mechanical devices, accompany and form a part of our disclosure.

In the drawings:

Fig. 1 is a perspective view of the mechanical set-up of the machine, without power;

Fig. 2 is a section, taken on the plane 1—1 in Fig. 1, with a holder holding a walnut, at the instant that electrode penetration has been accomplished;

Fig. 3 is a section taken on the plane 3—3, of Fig. 2, showing a partly sectioned nut held between two devices at the instant it is penetrated by electrodes;

Fig. 4 is the same structure shown in Fig. 2, with the operating parts in a different position, at the instant the electric surge strikes;

Fig. 5 is a diagram of an electrical surge circuit, suitable for the operation shown in Fig. 4; and Fig. 6 is a diagram illustrating the operation of the orienting device.

Describing the mechanisms illustrated and explaining their use and mode of operation in greater detail. As each nut is individually processed by the machine, a stream of nuts must be furnished in proper spaced relationship, by apparatus timed synchronously with the rest of the apparatus. The hopper 1 is shown as a nut supply means and the nut spacing means is a screw conveyor 2 and a smooth shaft 3, rolling together as shown by the arrows 3' and 3", being rotated by the gearing 7, of which the drive shaft 8, is the motive power, being operated by the chain 45 and a pair of sprockets deriving power in turn from shaft 20, geared to shaft 21. Shaft 21 has a power connection at one end, not shown, and a connection at its opposite end to operate the interrupter of the electric surge circuit of Fig. 5 in timed relationship with the other devices.

The nuts, of which a spaced apart stream of proceeding nuts are shown, proceeding by way of the screw 2, from the hopper 1, will drop one at a time on the orienting device represented here by the grooved wheels 9 and 10, each of which is a counterpart of the other and provided with gaps 9' and 10' in their perimeters. This orienting device is fully explained and claimed in the copending sole application, Serial Number 97,336, filed June 6, 1949, now Patent 2,609,942.

When the nut falls off the end of the conveyor 2 and 3 onto the orienting device, it may strike either of the wheels 9 or 10, haphazardly as to orientation, similarly as diagrammed in Fig. 6, with the orienting wheels revolving and the gaps 9' and 10' out of registration. During the balance of the revolution of wheels 9 and 10, by reason of the grooved perimeters of the wheels and the opposite revolution of the mating wheels (9 and 10), the nut will roll to the curved limb V region above the axes of the wheels and between them, substantially bisecting the axis of symmetry of the wheels.

A moment later the holder arm 24, by influence of the cam 44, mounted on the shaft 21, will have moved to hold the nut N (see Fig. 2), in position for electrode penetration. The holder arm 24 is preferably rubber faced as shown. In Fig. 2, the electrode 22 is shown in section, having just finished moving into either penetration or sufficiently firm contact to independently support the nut N. A moment later the arm 24 will have lifted by virtue of further movement of the cam, the wheels 9 and 10 will have moved to a position similar to that shown in Fig. 4, leaving the nut N entirely unsupported by the wheels 9 and 10, the gaps of which, 9' and 10', having moved to create a free air space within which the electrodes hold the nut, the air space entirely surrounds the nut N, the electric surge, timed with the machine as a whole has acted and the nut explodes as shown in Fig. 4, and the machine starts another cycle of continuous cracking of nuts, the results of the cracking described falling onto an apron conveyor not shown.

The electrodes are moved into timely puncturing position against a held nut by cams 42 and 43, operating cam followers 40 and 41, to reciprocate arms 38 and 39, made rigid with electrode holders 36, to which the heavily insulated electrodes 37 are suitably coupled.

It will probably be desirable in all cases to make the electrodes 22 and 23 with chucks such as 35 and renewable points 33 and 34 as shown in Fig. 4. Heavier type of steel phonograph needles are at present used but better material is being sought.

Fig. 4 shows a nut held as in Fig. 2, the ends of the nut having broken away portions to indicate maximum penetration deemed expedient.

The following is a description of the electric circuit delineated in Fig. 5, for an electrical expert to construct and use either it or another adequate circuit. Since no claims to the circuit are made herein, the description is thought to be adequate.

A full and further disclosure is to be found in the co-pending sole application of Melvin J. Kofoid, one of the joint inventors herein, Serial Number 136,435, filed Jan. 3, 1950.

The basic components of the electric circuit are shown in Fig. 5. This electrical arrangement is a means of producing electric surge discharges between electrodes 22 and 23 at a specific regular rate. The operation of the electric circuit is as follows:

1. Let the discharge capacitor be charged to the desired voltage by being connected to the high-voltage D.-C. power supply as shown.

2. When the interrupter switch $S_1$ is closed, the voltage which appears between points 22 and 23 is sufficient to cause electric breakdown between points 22 and 23 and hence through the nut.

3. As soon as breakdown between points 22 and 23 is established, a surge of current flows in the circuit consisting of the discharge capacitor, interrupter $S_1$ and discharge electrodes 22 and 23.

4. The surge of current lasts until the discharge capacitor is essentially discharged.

5. The shape of the surge current wave is determined by the magnitude of the capacitance of the discharge capacitor and by the total resistance and inductance of the discharge circuit.

6. The magnitude of the current is determined by these circuit constants and by the voltage to which the discharge capacitor is charged, just prior to breakdown.

7. The interrupter switch $S_1$ is quickly opened after the discharge capacitor is discharged; this permits the recharging of the discharge capacitor to start immediately after the surge discharge.

8. The discharge capacitor is charged to voltage again, i. e. the exact condition of step "1", by virtue of being connected to the high voltage D.-C. power supply as shown.

9. The high-voltage D.-C. power supply charges the discharge capacitor from a completely discharge condition to a condition of the discharge capacitor having a voltage between its terminals in a period of time of 1/N second, or less, if the discharge capacitor is to be discharged at a rate of N discharges per second.

10. The discharge capacitor is charged from a conventional type three-phase full-wave high-voltage rectifier through a special smoothing filter network.

11. The rectifier comprises a motor-generator set supplying low A.-C. voltage which is stepped up to high A.-C. voltage through a transformer and applied to kenotron rectifier tubes. The rectifier tubes effect the necessary electric valve action to provide unidirectional current flow.

12. The high-voltage electric supply is designed to produce a large number of surge discharges per second. The high voltage current has been carefully determined to be a minimum of five thousand amperes at a peak of seventy kilovolts for successful cracking.

13. To charge the discharge capacitor in a period of 1/N second or less (refer to part "9"), the necessary maximum value of current flowing into the discharge capacitor must be of a magnitude greatly in excess of the maximum current handling capacity of kenotron-type high-voltage rectifier tubes now available. (The necessary high maximum value of current flow into the capacitor occurs because of the inherent exponential nature of the current flow found generally in charging capacitors.)

14. The current drawn through the rectifier tubes is kept within suitable limits by causing current to flow continuously through a smoothing reactor $L_3$ into a storage capacitor as shown.

15. The electric energy stored up in the storage capacitor is available to charge the discharge capacitor by passing current to the discharge capacitor through the resistor $R_2$ and reactor $L_2$—without any necessary limits on the maximum value of current flowing into the discharge capacitor.

16. The resistor $R_2$ and reactor $L_2$ cause the current flowing between the high-voltage terminal of the storage capacitor and the high-voltage terminal of the discharge capacitor to have a preferred wave form and magnitude.

17. The distributor switch S'' has a multiplicity of points, each connected to the high-voltage electrode of a separate feeding and cracking mechanism. Thus, the electric surges produced by the discharge of the capacitor are distributed to the different feeding and cracking mechanisms in a repeated regular prescribed order.

Having fully disclosed our joint invention, what we claim as new and desire to secure by Letters Patent, is:

1. In an electric nut cracking apparatus adapted solely for shattering the shell of nuts by passage of a disruptive high voltage, high current impulse arc discharge therethrough, the combination comprising a pair of relatively movable aligned pointed electrodes, movable means supporting each of said electrodes for simultaneous movement toward and away from each other along a fixed path of travel, means for positioning and temporarily holding a nut in said path of travel between said electrodes while in the widely separated condition thereof, whereby upon subsequent movement of said electrodes toward each other the opposite sides of said nut will be engaged by said electrodes at substantially diametrically opposite points for supporting said nut in a cracking position independently of said positioning and holding means, and high voltage, high current generating and discharging apparatus connected to said electrodes for causing an impulse discharge to take place between said electrodes when in the nut engaging position.

2. In a nut cracking machine adapted solely for shattering the shell of nuts by passage of a disruptive high voltage, high current impulse arc discharge therethrough, the combination comprising a pair of pointed, aligned electrodes mounted for movement along a predetermined axis between a first widely separated condition to a second position in which they are spaced apart a distance slightly less than the diameter of the nut to be cracked, means for feeding a stream of individual, spaced apart nuts toward said axis in synchronism with the movement of said electrodes, positioning means for receiving one nut at a time from said feeding means and for momentarily stationarily supporting said nut upon said axis in the widely separated condition of said electrodes, said electrodes upon subsequent movement toward each other engaging the opposite sides of the nut for solely supporting the same, means for moving said positioning means to a position away from said nut upon engagement thereof by said electrodes, and high voltage, high current generating and discharging apparatus connected to said electrodes for causing an impulse discharge to take place between said electrodes when in the nut engaging position.

3. In an electric nut cracking apparatus adapted solely for shattering the shell of nuts by passage of a disruptive high voltage, high current impulse arc discharge therethrough, the combination comprising a pair of aligned relatively movable pointed electrodes, movable means supporting at least one of said electrodes for movement to a first limit position away from the other of said electrodes by a distance greater than the maximum dimension of the nuts to be cracked, and for movement to a second limit position spaced toward said other electrode by a distance slightly less than the diameter of the nuts to be cracked whereby when a nut is positioned between said electrodes in the separated condition thereof it is penetrated by at least one of said electrodes when they are subsequently moved together, insulating means arranged adjacent the space between said electrodes for positioning a nut between said electrodes in the widely separated condition thereof and for cooperative engagement of said nut by said electrodes, and means connected to said positioning means for shifting said positioning means away from the vicinity of said nut after engagement thereof by said electrodes whereby said nut is supported in free space solely by said electrodes, and electric circuit means connected to said electrodes for causing a nut shell shattering high current impulse discharge to occur therebetween upon movement of said electrodes to said second limit position.

4. In an electric nut cracking apparatus adapted solely for shattering the shell of nuts by passage of a disruptive high voltage, high current impulse arc discharge therethrough, the combination comprising a pair of aligned, elongated electrode assemblies mounted for movement toward and away from each other along a predetermined axis between a first widely separated condition toward a second condition spaced apart a distance slightly less than the diameter of nuts to be cracked, each of said electrode assemblies including an insulating supporting member and a removable pointed electrode tip whereby upon movement of said electrode assemblies toward each other to said second condition and with a nut positioned therebetween, said electrode tips will penetrate slightly into the opposite sides of the nut shell for solely supporting the nut therebetween and for establishing an electrical discharge path through the nut, operating means connected to said electrode assemblies for positively driving said assemblies from one of said conditions to the other, and high voltage, high current generating and discharging apparatus connected to said electrode assemblies for causing an impulse discharge to take place between said electrodes when in the nut engaging position.

5. In an electric nut cracking apparatus adapted solely for shattering the shell of nuts by passage of a disruptive high voltage, high current impulse arc discharge therethrough, the combination comprising a pair of aligned, elongated electrode assemblies mounted for movement toward and away from each other along a predetermined axis between a first widely separated condition toward a second condition spaced apart a distance slightly less than the diameter of nuts to be cracked, each of said electrode assemblies including an insulating supporting member and a pointed electrode tip whereby upon movement of said electrode assemblies toward each other to said second condition and with a nut positioned therebetween, said pointed electrode tips will penetrate slightly into the opposite sides of the nut shell for solely supporting the nut therebetween in free space and for establishing an electrical discharge path through the nut, driving means connected to both of said supporting members for actuating the same simultaneously in opposite directions between said first and second conditions, and feeding means driven by said driving means for feeding one nut at a time between said electrodes during the widely separated condition thereof, and high voltage, high current generating and discharge apparatus connected to said electrode assemblies for causing an impulse discharge to take place between said electrode assemblies when in the nut engaging position.

6. In an electric nut cracking machine adapted solely for shattering the shell of nuts by passage of a disruptive high voltage, high current impulse arc discharge therethrough, the combination comprising a pair of aligned pointed electrodes mounted for movement between a first widely separated condition to a second position adjacent each other for penetrating opposite sides of the shell of a nut fed therebetween, means for feeding one nut between said electrodes each time they are moved to said widely separated condition, driving means connected to said electrodes adapted for positively driving the pointed ends of said electrodes into contact with the opposite sides of the nut fed therebetween and for solely supporting the same, an electric discharge circuit means connected to said electrodes, said circuit means including a switch driven in synchronism with said electrodes and closed each time said electrodes are moved to said second position for causing a nut shell explosive discharge to take place therebetween.

7. An electric nut shell exploding apparatus adapted for shattering the shell of nuts by passage of a disruptive high voltage, high current impulse arc discharge therethrough, said apparatus comprising a conveyor for feeding a stream of nuts in an individual, spaced apart relation, orienting means positioned adjacent the end of said conveyor for receiving said nuts one at a time therefrom and positioning the received nut relatively stationarily with its major axis extending in a predetermined direction, a pair of pointed electrodes movably mounted on opposite sides of said orienting means and movable toward and away from each other in said predetermined direction and in substantial alignment with the major axis of the positioned nut, means for moving both said electrodes into contact with a nut positioned by said orienting means, means for moving said orienting means away from said nut after said electrodes are moved into contact therewith permitting said nut to be supported solely by said electrodes, and electrical circuit apparatus operable in timed relation with said orienting means and connected to said electrodes for causing a shell explosive high voltage electrical discharge through the nut upon contact therewith by said electrodes, and after said orienting means have been moved away from said nut.

8. An electric nut shell exploding apparatus adapted for shattering the shell of nuts by passage of a disruptive high voltage, high current impulse arc discharge therethrough, said apparatus comprising a nut orienting means adapted for receiving one nut at a time and positioning the same upon a predetermined axis, a nut holding means cooperatively mounted adjacent said orienting means for temporarily holding a nut thereupon in a relatively stationary predetermined position on said axis, a pair of aligned pointed electrodes mounted for movement toward and away from each other along said axis on opposite sides of said nut held in said predetermined position, means operatively connected to said electrodes for moving the same into contact with said nut, means for moving both said orienting and holding means away from said nut upon contact thereof by said electrodes permitting said nut to be solely supported by said electrodes, and electrical circuit apparatus connected to said electrodes for causing a high current shell explosive discharge between said electrodes upon movement of said orienting and holding means away from said nut.

9. In an electric nut exploding machine adapted for shattering the shell of nuts by passage of a disruptive high voltage, high current impulse arc discharge therethrough, a high voltage circuit apparatus including a pair of opposed pointed and aligned electrodes mounted for movement toward and away from each other along a predetermined axis, conveyor means for feeding a stream of nuts in a spaced apart, single unit relation, orienting means mounted adjacent said conveyor and adapted to receive said nuts individually and to orient them to a position with their longer axes in substantial alignment with said predetermined axis, a holding means movably mounted adjacent said orienting means and operable in timed relation with said feeding means for holding a nut on said orienting means in said position, means for actuating said electrodes into intimate contact with the opposite ends of a held nut, means connected to said orienting means and holding means for moving them to a position remote from said nut upon engagement of said nut by said electrodes whereby said nut will be supported in free space solely by said electrodes, said high voltage apparatus including switch means operable in timed relation with said electrodes for causing a high voltage current discharge through the nut upon contact thereof with said nut and after removal of said orienting and holding means from the vicinity of said nut.

References Cited in the file of this patent

UNITED STATES PATENTS

| Number | Name | Date |
|---|---|---|
| 1,250,140 | Chapman | Dec. 18, 1917 |
| 1,427,817 | Hutchinson | Sept. 5, 1922 |
| 1,440,744 | Phillipe | Jan. 2, 1923 |
| 1,461,410 | Aldrich | July 10, 1923 |
| 1,656,887 | Goldsmith | Jan. 17, 1928 |
| 1,927,847 | Resser | Sept. 26, 1933 |
| 1,965,460 | Gebhardt | July 3, 1934 |
| 1,973,395 | Schreiber | Sept. 11, 1934 |
| 2,000,749 | Franklin | May 7, 1935 |
| 2,065,544 | Strong | Dec. 29, 1936 |
| 2,114,243 | Whitehead | Apr. 12, 1938 |
| 2,200,405 | Watson | May 14, 1940 |
| 2,230,790 | Anderson | Feb. 4, 1941 |
| 2,248,368 | Low | July 8, 1941 |
| 2,308,860 | Clark | Jan. 19, 1943 |
| 2,365,576 | Meaker et al. | Dec. 19, 1944 |
| 2,601,421 | Thaning | June 24, 1952 |
| 2,609,942 | Kofoid | Sept. 9, 1952 |